United States Patent
Kuo et al.

(10) Patent No.: US 9,036,347 B2
(45) Date of Patent: May 19, 2015

(54) DISPLAY DEVICE CAPABLE OF FIXING A SCREEN AT DIFFERENT VIEW ANGLES

(71) Applicant: Wistron Corporation, New Taipei (TW)

(72) Inventors: Yu-Ling Kuo, New Taipei (TW); Chun Chang, New Taipei (TW); Kai-Hsiang Chang, New Taipei (TW)

(73) Assignee: Winstron Corporation, Hsichih, New Taipei (TW)

( * ) Notice: Subject to any disclaimer, the term of this patent is extended or adjusted under 35 U.S.C. 154(b) by 136 days.

(21) Appl. No.: 14/017,313

(22) Filed: Sep. 4, 2013

(65) Prior Publication Data

US 2014/0139982 A1 May 22, 2014

(30) Foreign Application Priority Data

Nov. 21, 2012 (TW) .............................. 101143506 A

(51) Int. Cl.
- H05K 5/00 (2006.01)
- F16M 11/10 (2006.01)
- F16M 11/38 (2006.01)
- G06F 1/16 (2006.01)

(52) U.S. Cl.
CPC ............... *F16M 11/10* (2013.01); *F16M 11/38* (2013.01); *G06F 1/16* (2013.01); *F16M 2200/08* (2013.01); *G06F 1/1601* (2013.01); *G06F 1/1626* (2013.01); *G06F 1/1637* (2013.01); *G06F 2200/1612* (2013.01)

(58) Field of Classification Search
CPC ... F16M 2200/08; F16M 11/00; F16M 11/04; H05K 5/0234; G06F 1/166
See application file for complete search history.

(56) References Cited

U.S. PATENT DOCUMENTS

| | | | | |
|---|---|---|---|---|
| 6,971,622 B2 * | 12/2005 | Ziegler et al. | ................. | 248/454 |
| 7,203,058 B2 | 4/2007 | Hong | | |
| 7,758,009 B1 * | 7/2010 | Chang | ........................... | 248/460 |
| 8,248,791 B2 * | 8/2012 | Wang et al. | ............. | 361/679.59 |
| 8,605,431 B2 * | 12/2013 | Cheng et al. | ............. | 361/679.56 |
| 2006/0145046 A1 * | 7/2006 | Liou et al. | ..................... | 248/455 |
| 2006/0186303 A1 * | 8/2006 | Phifer et al. | ................. | 248/454 |

FOREIGN PATENT DOCUMENTS

| | | |
|---|---|---|
| CN | 1605970 A | 4/2005 |
| JP | 10143086 | 5/1998 |

OTHER PUBLICATIONS

Office action mailed on Oct. 31, 2014 for the Taiwan application No. 101143506, filed: Nov. 21, 2012, p. 2 line 1~20 and line 23~26, p. 3 line 1~7, line 13~23 and line 25~26, p. 4 line 1~2, line 4~11, line 15~18 and 21~25 and p. 5 line 1~6.

* cited by examiner

*Primary Examiner* — Robert J Hoffberg
*Assistant Examiner* — Hung Dang
(74) *Attorney, Agent, or Firm* — Winston Hsu; Scott Margo

(57) ABSTRACT

The present invention discloses a display device including a base, a screen and a fixing mechanism. The fixing mechanism is connected to the base and the screen for fixing the screen on the base. The fixing mechanism includes a supporting structure rotatably installed on the base. Two ends of the supporting structure selectively engage with a plurality of constraining portions on the screen so as to fix the screen at different view angles relative to the base. The fixing mechanism further includes a resilient component sheathing with the supporting structure. An end of the resilient component is fixed on the base, and the other end of the resilient component is fixed on the supporting structure. The resilient component provides torque to the supporting structure as the screen rotates relative to the base.

16 Claims, 6 Drawing Sheets

DISPLAY DEVICE CAPABLE OF FIXING A SCREEN AT DIFFERENT VIEW ANGLES

BACKGROUND OF THE INVENTION

1. Field of the Invention

The present invention relates to a display device capable of fixing a screen at different view angles, and more particularly, to a display device utilizing a supporting structure to fix the screen at different view angles.

2. Description of the Prior Art

With the advanced technology, the display of the electronic device trends a large-scaled for comfortable entertainment enjoyment. Generally, two sides of the display are disposed on the base via pivot mechanisms. The user can rotate the display according to a position of the electronic device, to adjust a pivot angle of the display relative to the supporter for a preferred view angle. The pivot mechanism utilizes friction to generate force for supporting the display, so as to fix the pivot angle of the display relative to the supporter. However, the conventional pivot mechanism is directly assembled between the display and the base, and has drawbacks of constraint of appearance design and plenty of structural components. Therefore, design of a display device with easy structure and unable to be constrained by the appearance design due to assembly of pivot mechanism is an important issue in the display device mechanical design industry.

SUMMARY OF THE INVENTION

The present invention provides a display device utilizing a supporting structure to fix the screen at different view angles for solving above drawbacks.

According to the claimed invention, a display device capable of fixing a screen at different view angles is disclosed. The display device includes a base, the screen and a fixing mechanism. The screen is disposed on a side of the base in a relatively rotatable manner, and a plurality of constraining portions is formed on a back of the screen. The fixing mechanism is connected to the base and the screen for fixing the screen on the base. The fixing mechanism includes a supporting structure and a resilient component. The supporting structure is rotatably disposed on the base. Two ends of the supporting structure are selectively combined with the plurality of constraining portions, so as to fix the screen at different view angles relative to the base. The resilient component sheathes with the supporting structure for providing torque to the supporting structure when the screen rotates relative to the base. An end of the resilient component is fixed on the base, and the other end of the resilient component is fixed on the supporting structure.

According to the claimed invention, the supporting structure includes two supporting components and a connecting bar, two ends of the connecting bar are respectively connected to ends of the supporting components. The fixing mechanism further includes two hinge components respectively fixed on the base for sheathing with the supporting components, so as to coaxially rotate the supporting components.

According to the claimed invention, two ends of the connecting bar are respectively fixed on the ends of the supporting components in a bolt locking manner.

According to the claimed invention, two contacting portions are respectively formed on two sides of the base for blocking the hinge components.

According to the claimed invention, two restraining portions are formed on the base respectively for restraining rotary angles of the supporting components.

According to the claimed invention, the supporting structure includes two supporting components connected to each other. The fixing mechanism further includes two hinge components respectively fixed on the base for sheathing with the supporting components, so as to coaxially rotate the supporting components.

According to the claimed invention, the two supporting components are connected to each other in a bolt locking manner.

According to the claimed invention, the constraining portions respectively are arc slots, and an arc structure is formed on the other end of each supporting component for engaging inside the arc slot.

According to the claimed invention, angles between the back of the screen and the plurality of arc slots arranged from far to close relative to the base are gradually increased, so as to match the arc structure with the plurality of arc slots.

According to the claimed invention, a protrusion is further formed on the back of the screen. The protrusion is disposed on a side of the nearest arc slot relative to the base for supporting the other end of the supporting component when the other end of the supporting component is engaged with the nearest arc slot relative to the base.

According to the claimed invention, the display device further includes a base cover disposed on the base for covering parts of the supporting structure and the resilient component.

The display device of the present invention utilizes the supporting structure to fix the screen at different view angles. The present invention does not set the conventional pivot mechanism (which provides the torque) directly between the screen and the base, so the display device of the present invention includes few components and has clear appearance. Thus, the present invention provides the display device with easy structure and preferred aesthetic.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
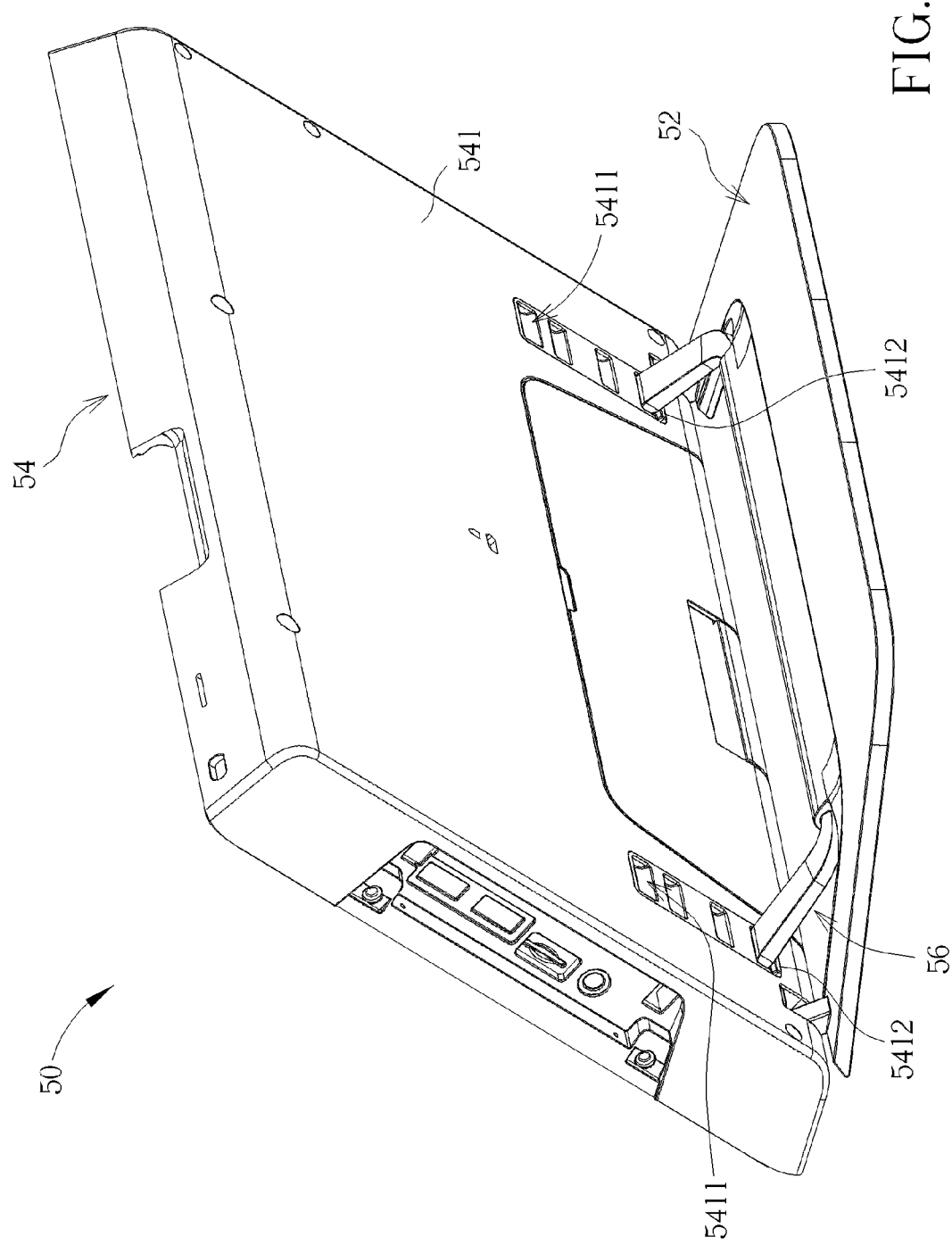
FIG. 1 is a diagram of a display device according to an embodiment of the present invention.
Figure 2:
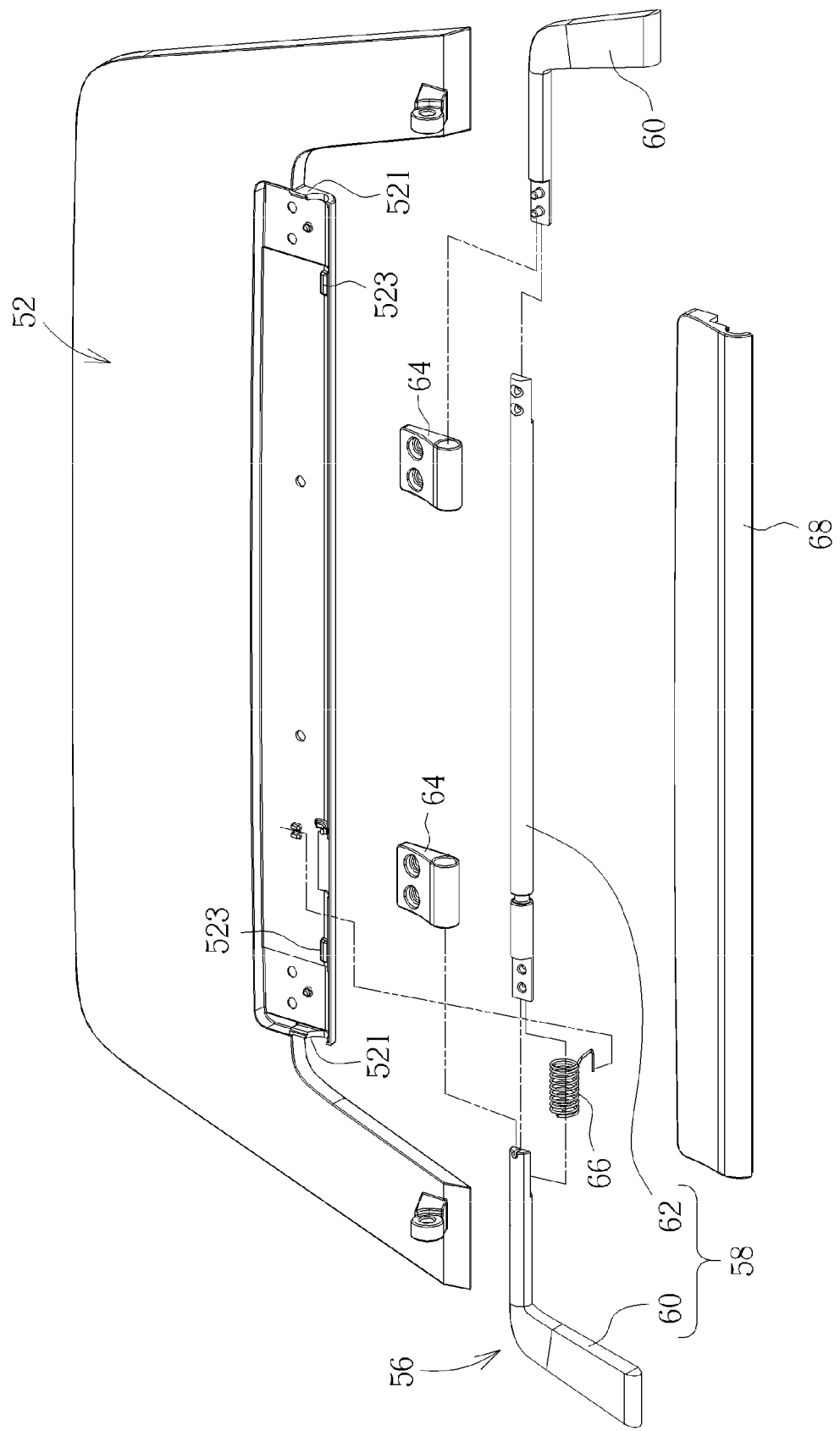
FIG. 2 is an exploded diagram of a fixing mechanism according to the embodiment of the present invention.
Figure 3:
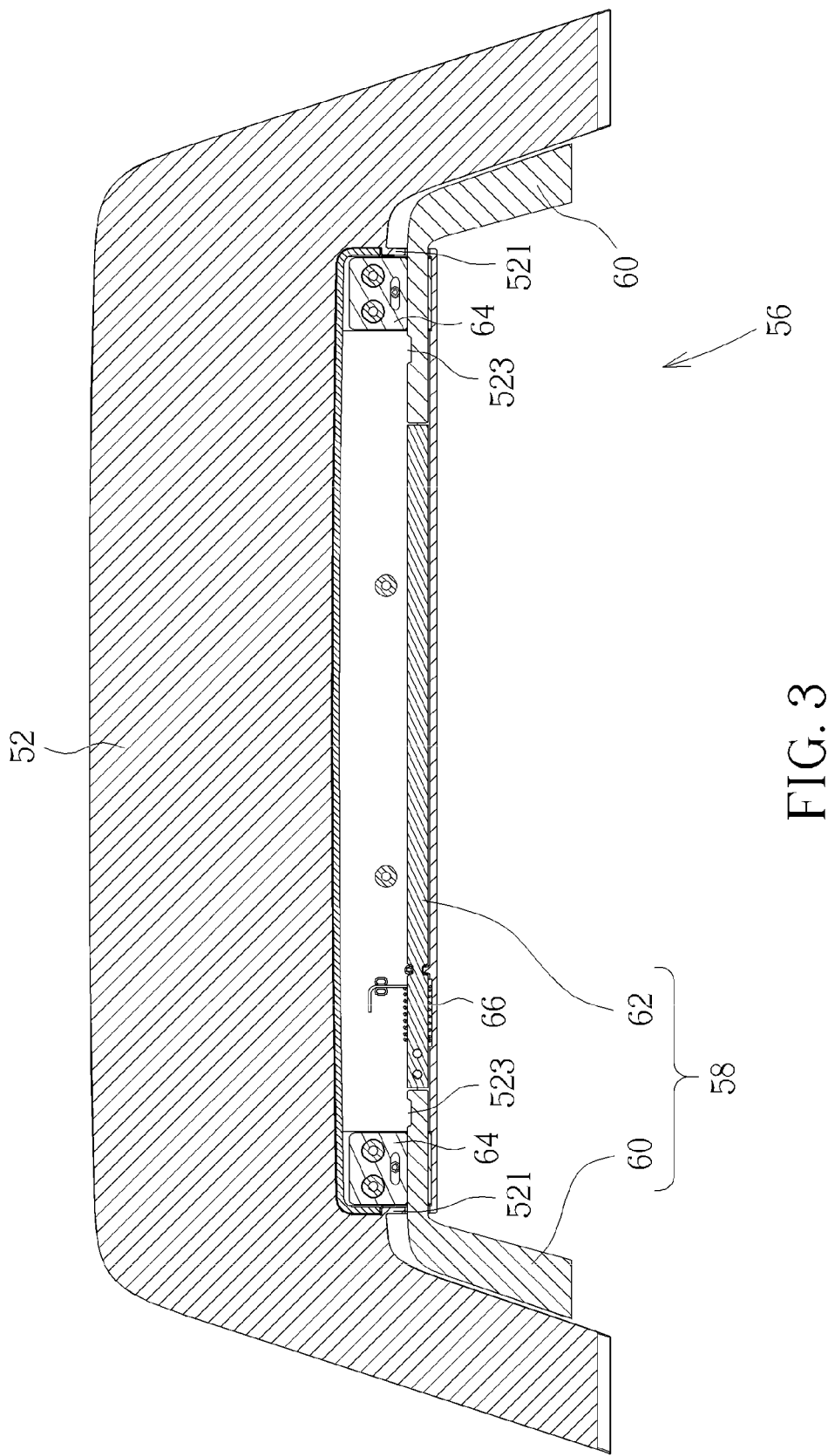
FIG. 3 is a sectional view of the fixing mechanism according to the embodiment of the present invention.

Please refer to FIG. 1. FIG. 1 is a diagram of a display device 50 according to an embodiment of the present invention. The display device 50 includes a base 52 and a screen 54. The screen 54 is disposed on a side of the base 52 in a relatively rotatable manner. A plurality of constraining portions 5411 is formed on a back 541 of the screen 54. The display device 50 further includes a fixing mechanism 56 connected to the base 52 for fixing the screen 54 on the base 52. Please refer to FIG. 1 to FIG. 3. FIG. 2 is an exploded diagram of the fixing mechanism 56 according to the embodiment of the present invention. FIG. 3 is a sectional view of the fixing mechanism 56 according to the embodiment of the present invention. The fixing mechanism 56 includes a supporting structure 58 rotatably disposed on the base 52. Two ends of the supporting structure 58 are selectively combined with the right constraining portion 5411 and the left constraining portion 5411 of the plurality of constraining portions 5411, so as to fix the screen 54 at different view angles relative to the base 52.

In the embodiment, the supporting structure 58 includes two supporting components 60 and a connecting bar 62. Two ends of the connecting bar 62 are respectively connected to ends of the two supporting components 60, so that the connecting bar 62 and the supporting components 60 can rotate synchronously.

The ends of the connecting bar 62 can be respectively fixed on the ends of the supporting components 60 in a bolt locking manner. Connection between the connecting bar 62 and the supporting component 60 is not limited to the above-mentioned embodiment, and depends on actual design demand. In addition, the fixing mechanism 56 further includes two hinge components 64 respectively fixed on the base 54 for sheathing with the two supporting components 60, so that the supporting components 60 separately disposed on two sides of the connecting bar 62 can rotate coaxially. Two contacting portions 521 can be respectively formed on two sides of the base 52 for blocking the two hinge components 64, so as to fix the hinge components 64 and to prevent the hinge components 64 from moving along an axial direction of the connecting bar 62. The contacting portion 521 can be a block stretching from a lateral side of the base 52.

Besides, the fixing mechanism 56 further includes a resilient component 66 sheathing with the supporting structure 58, such as sheathing on the connecting bar 62. An end of the resilient component 66 is fixed on the base 52, and the other end of the resilient component 66 is fixed on the supporting structure 58. For example, the other end of the resilient component 66 can be fixed on one of the supporting components 60. The resilient component 66 provides torque to the supporting structure 58 when the screen 54 rotates relative to the base 52. The resilient component 66 can be a torsional spring.

It is to say, the resilient component 66 is not resiliently deformed when the supporting structure 58 contacts the base 52 and is at an initial mode. The resilient component 66 is resiliently deformed when the supporting structure 58 rotates relative to the base 52, so as to provide the torque to the supporting structure 58 by resilient deformation, and the supporting structure 58 can fix the screen 54 at different view angles relative to the base 52. Two restraining portions 523 can be further formed on the base 52 respectively for restraining rotary angles of the two supporting components 60. For example, the restraining portion 523 can be a low dead point to prevent the supporting component 60 from hitting the supporting plane due to over-rotation; the restraining portion 523 can further be an upper dead point to prevent the resilient component 66 from overdriving the supporting structure 58, which results in collapse of the screen 54, and further to prevent the resilient component 66 from resilient fatigue. In addition, the display device 50 further includes a base cover 68 disposed on the base 52 for covering parts of the supporting structure 58 and the resilient component 66, so as to fix the supporting structure 58 and the resilient component 66 and to advance preferred aesthetic.

Figure 4:
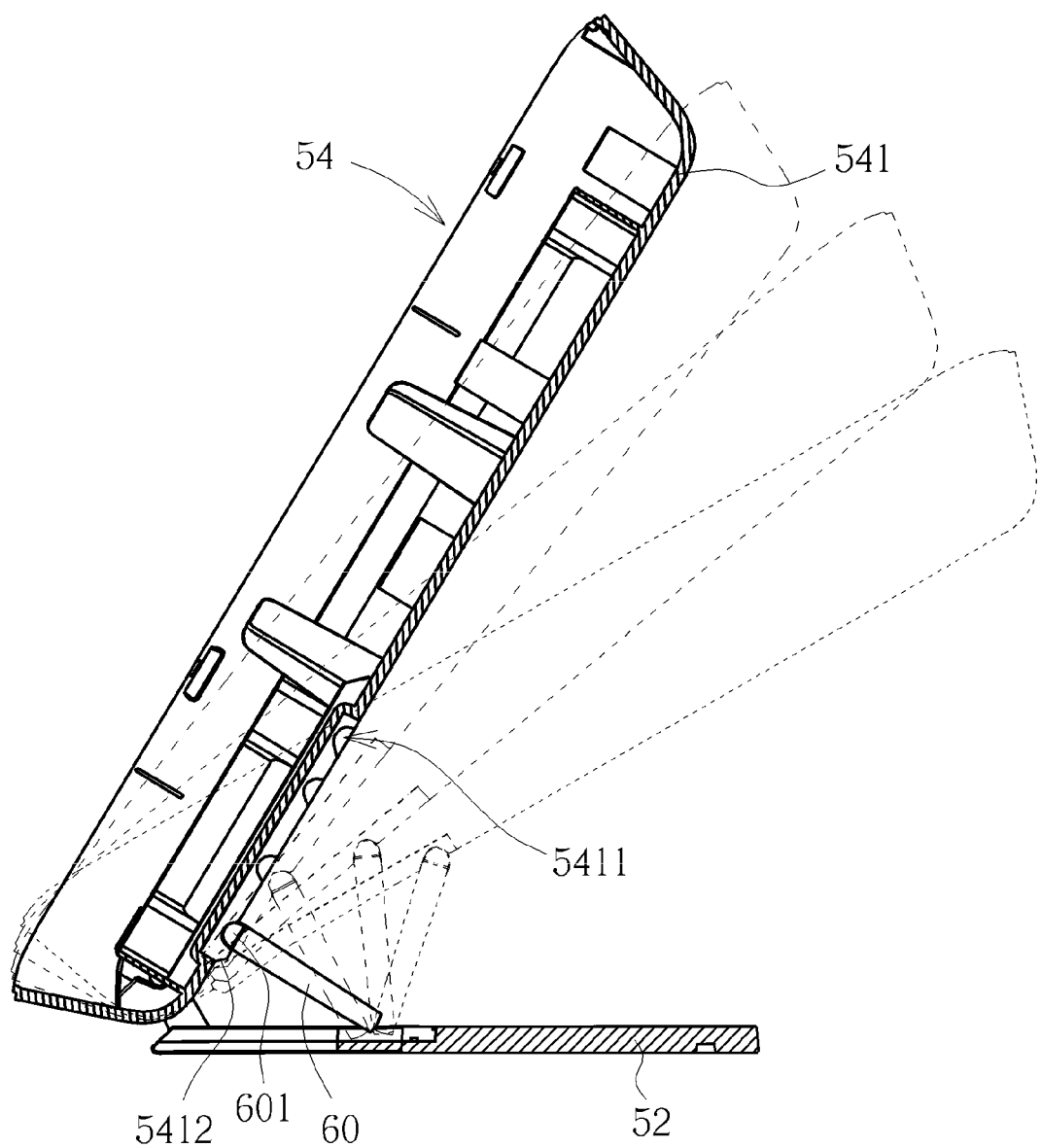
FIG. 4 is a diagram of a screen fixed at different view angles relative to a base according to the embodiment of the present invention.

Please refer to FIG. 1 and FIG. 4. FIG. 4 is a diagram of the screen 54 fixed at different view angles relative to the base 52 according to the embodiment of the present invention. The plurality of constraining portions 5411 formed on the back 541 of the screen 54 can respectively be arc slots. An arc structure 601 can be formed on the other end of each supporting component 60 for engaging with the arc slot, so that the other end of the supporting component 60 can smoothly insert into the constraining portion 5411 via a combination of the arc slot and the arc structure 601. In addition, angles between the back 541 of the screen 54 and the plurality of constraining portions 5411 (the arc slots) arranged from far to near relative to the base 52 are gradually increased, which means the upper constraining portion 5411 formed on the back 541 of the screen 54 is inclined downwardly, and the low constraining portion 5411 formed on the back 541 of the screen 54 is substantially perpendicular to the back 541. When the screen 54 is fixed at different view angles relative to the base 52, the arc structure 601 of the supporting component 60 can insert into each constraining portion 5411, and further can completely contact against the corresponding arc slot according to the view angle of the screen 54 relative to the base 52, so that the other end of the supporting component 60 can be tightly engaged with the constraining portion 5411. As shown in FIG. 4, the supporting component 60 can be matched with the corresponding constraining portion 5411 due to different view angle of the screen 54 relative to the base 52, and an aim of tight engagement between the arc structure 601 of the supporting component 60 and the corresponding constraining portion 5411 is achieved.

A protrusion 5412 can further be formed on the low side of the back 541 of the screen 54. The protrusion 5412 is disposed on a side of the nearest constraining portion 5411 relative to the base 52, which means the lowest constraining portion 5411, for supporting the other end of the supporting component 60 when the other end of the supporting component 60 is engaged with the nearest constraining portion 5411. It is to say, because the nearest constraining portion 5411 relative to the base 52 has small sunken square measure, the additional protrusion 5412 can be utilized to support the other end of the supporting component 60, so as to get preferred fixing efficiency when the other end of the supporting component 60 is engaged with the lowest constraining portion 5411. In conclusion, the present invention can utilize the two supporting components 60 to selectively engage with two constraining portions 5411 of the plurality of constraining portions 5411, so as to adjust the view angle of the screen 54 relative to the base 52. As the supporting structure 58 rotates relative to the base 52, the resilient component 66 is resiliently deformed to provide the torque to the supporting structure 58, and the supporting component 60 can fix the screen 54 at different view angles relative to the base 52.

Figure 5:
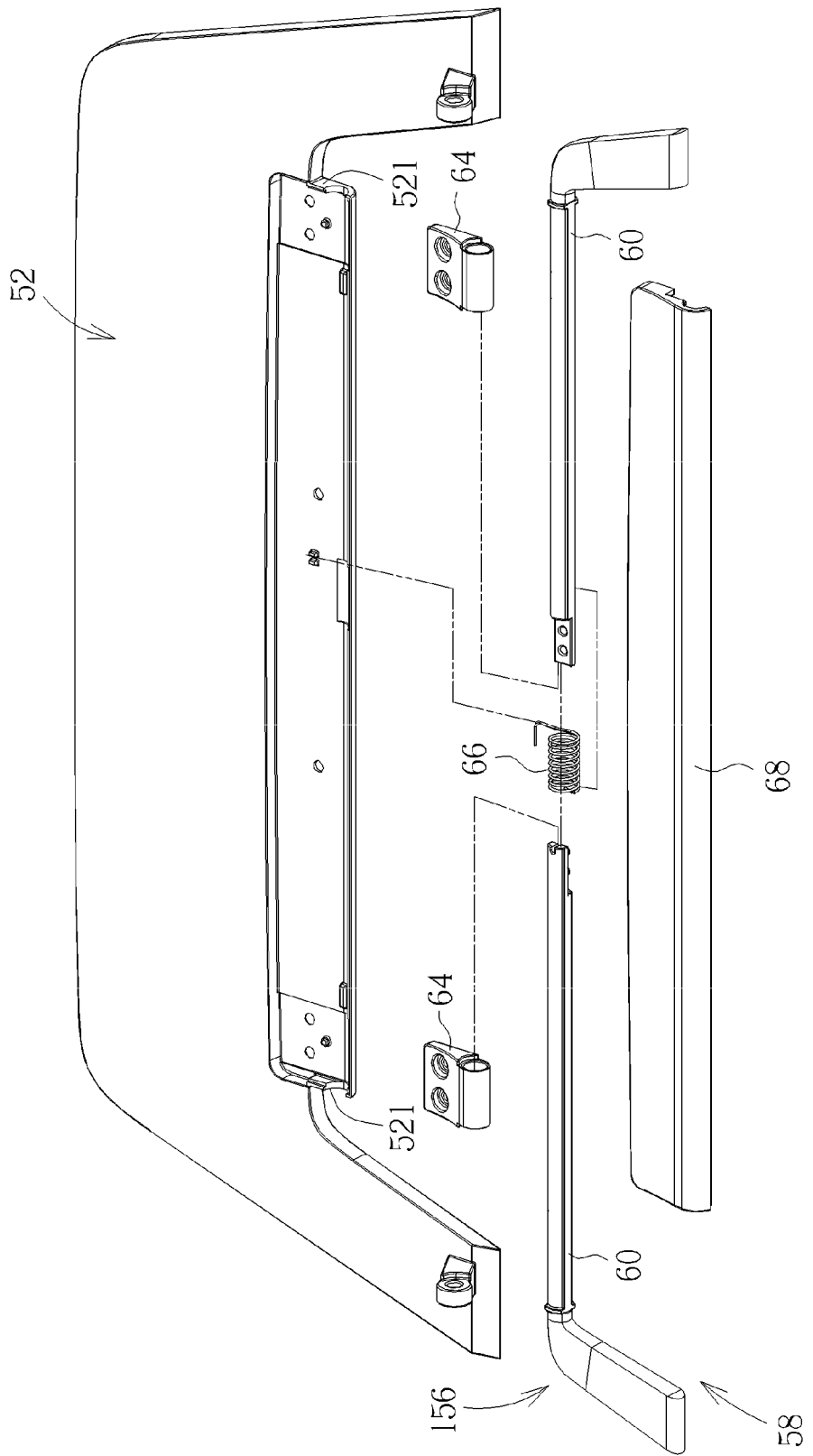
FIG. 5 is an exploded diagram of a fixing mechanism according to the other embodiment of the present invention.
Figure 6:
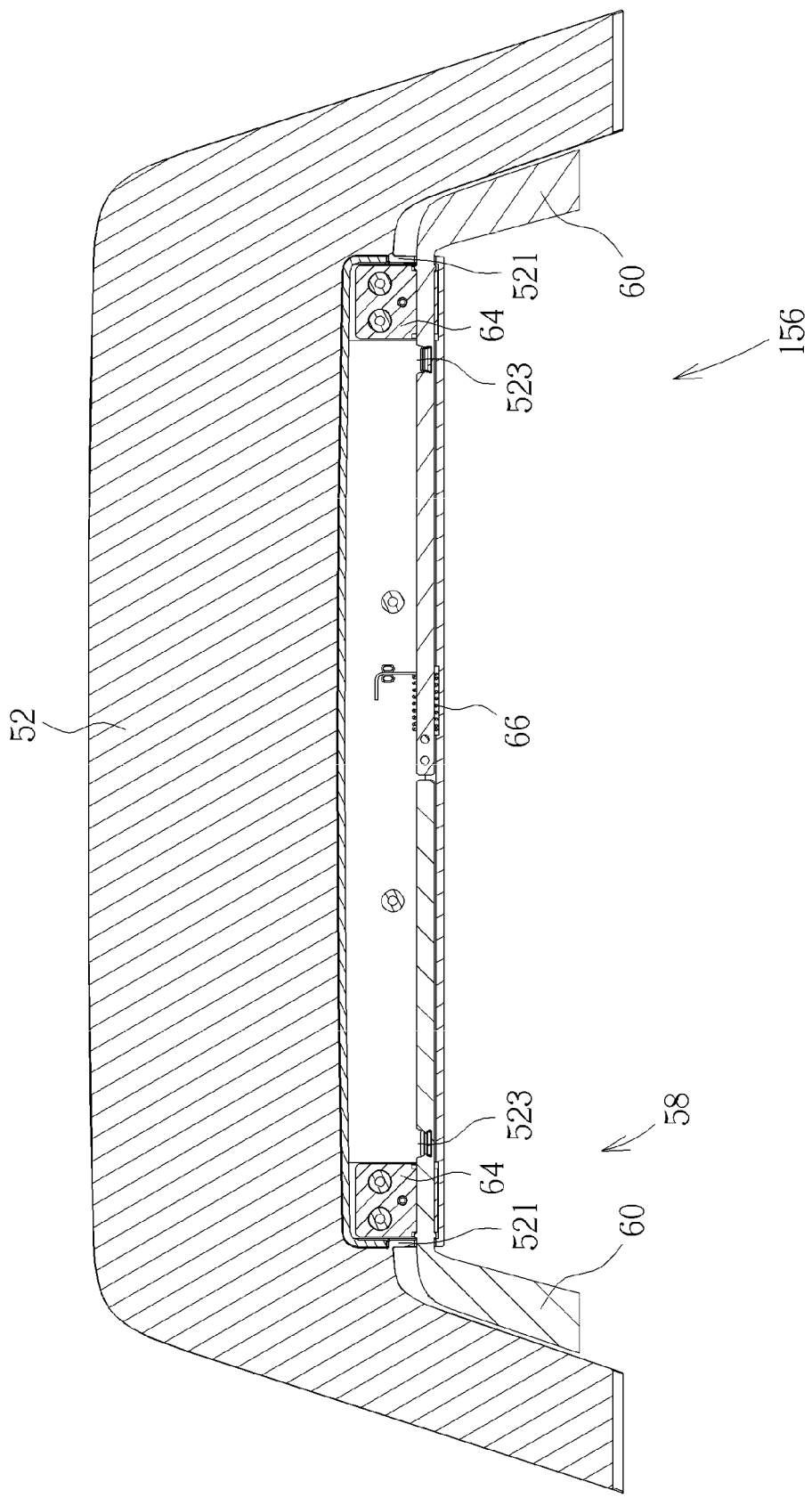
FIG. 6 is a sectional view of the fixing mechanism according to the other embodiment of the present invention.

Please refer to FIG. 5 and FIG. 6. FIG. 5 is an exploded diagram of the fixing mechanism 156 according to the other embodiment of the present invention. FIG. 6 is a sectional view of the fixing mechanism 156 according to the other embodiment of the present invention. Different between this embodiment and the above-mentioned embodiment is that the connecting bar 62 of the above-mentioned embodiment is omitted herein. In this embodiment, the two supporting components 60 are connected to each other, for example, the supporting components 60 are connected in the bolt locking manner. The two hinge components 64 are respectively fixed on the base 52 for sheathing with the supporting components 60 to axially rotate the supporting components 60. The contacting portions 521 can be respectively formed on two sides of the base 52 for blocking the hinge components 64. The contacting portion 521 can be a block stretching from a lateral side of the base 52. The resilient component 66 can sheath with one of the supporting components 60. The end of the resilient component 66 is fixed on the base 52, and the other end of the resilient component 66 is fixed on one of the supporting components 60. The resilient component 66 provides the torque to the supporting structure 58 when the screen 54 rotates relative to the base 52. The two restraining portions 523 can respectively restrain the rotary angles of the supporting components 60. For example, the restraining portion 523 can be the low dead point to prevent the supporting component 60 from hitting the supporting plane by over-rotation; and the restraining portion 523 further can be the upper dead point to prevent the resilient component 66 from overdriving the supporting structure 58, which results in the collapse of the screen 54, and further to prevent the resilient component 66 from the resilient fatigue. The base cover 68 is disposed on the base 52 for covering parts of the supporting structure 58 and the resilient component 66, so as to fix the supporting structure 58 and the resilient component 66 and to advance the preferred aesthetic. Disposition and function of the other components are the same as ones of the above-mentioned embodiment, and detailed description is omitted herein for simplicity.

Comparing to the prior art, the display device of the present invention utilizes the supporting structure to fix the screen at different view angles. The present invention does not set the conventional pivot mechanism (which provides the torque) directly between the screen and the base, so the display device of the present invention includes few components and has clear appearance. Thus, the present invention provides the display device with easy structure and preferred aesthetic.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display device comprising:
a base;
a screen disposed on a side of the base in a relatively rotatable manner, a plurality of constraining portions being formed on a back of the screen; and
a fixing mechanism connected to the base and the screen for fixing the screen on the base, the fixing mechanism comprising:
a supporting structure rotatably disposed on the base, two ends of the supporting structure being selectively combined with the plurality of constraining portions, so as to fix the screen at different view angles relative to the base; and
a resilient component sheathing with the supporting structure for providing torque to the supporting structure when the screen rotates relative to the base, an end of the resilient component being fixed on the base, and the other end of the resilient component being fixed on the supporting structure.

2. The display device of claim 1, wherein the supporting structure comprises two supporting components and a connecting bar, two ends of the connecting bar are respectively connected to ends of the supporting components, the fixing mechanism further comprises two hinge components respectively fixed on the base for sheathing with the supporting components so as to coaxially rotate the supporting components.

3. The display device of claim 2, wherein two ends of the connecting bar are respectively fixed on the ends of the supporting components in a bolt locking manner.

4. The display device of claim 2, wherein two contacting portions are respectively formed on two sides of the base for blocking the hinge components.

5. The display device of claim 2, wherein two restraining portions are formed on the base for respectively restraining rotary angles of the supporting components.

6. The display device of claim 1, wherein the supporting structure comprises two supporting components connected to each other, the fixing mechanism further comprises two hinge components respectively fixed on the base for sheathing with the supporting components so as to coaxially rotate the supporting components.

7. The display device of claim 6, wherein the supporting components are connected to each other in a bolt locking manner.

8. The display device of claim 1, wherein two contacting portions are respectively formed on two sides of the base for blocking the hinge components.

9. The display device of claim 1, wherein two restraining portions are formed on the base for respectively restraining rotary angles of the supporting components.

10. The display device of claim 2, wherein the constraining portions respectively are arc slots, and an arc structure is formed on the other end of each supporting component for engaging inside the arc slot.

11. The display device of claim 10, wherein angles between the back of the screen and the plurality of arc slots arranged from far to close relative to the base are gradually increased, so as to match the arc structure with the plurality of arc slots.

12. The display device of claim 11, wherein a protrusion is further formed on the back of the screen, the protrusion is disposed on a side of the nearest arc slot relative to the base for supporting the other end of the supporting component when the other end of the supporting component is engaged with the nearest arc slot relative to the base.

13. The display device of claim 6, wherein the constraining portions respectively are arc slots, and an arc structure is formed on the other end of each supporting component for engaging inside the arc slot.

14. The display device of claim 13, wherein angles between the back of the screen and the plurality of arc slots arranged from far to close relative to the base are gradually increased, so as to match the arc structure with the plurality of arc slots.

15. The display device of claim 14, wherein a protrusion is further formed on the back of the screen, the protrusion is disposed on a side of the nearest arc slot relative to the base for supporting the other end of the supporting component when the other end of the supporting component is engaged with the nearest arc slot relative to the base.

16. The display device of claim 1, further comprising:
a base cover disposed on the base for covering parts of the supporting structure and the resilient component.

* * * * *

UNITED STATES PATENT AND TRADEMARK OFFICE
CERTIFICATE OF CORRECTION

| | | |
|---|---|---|
| PATENT NO. | : 9,036,347 B2 | Page 1 of 1 |
| APPLICATION NO. | : 14/017313 | |
| DATED | : May 19, 2015 | |
| INVENTOR(S) | : Yu-Ling Kuo et al. | |

It is certified that error appears in the above-identified patent and that said Letters Patent is hereby corrected as shown below:

On the title page, item (73), correct the name of the assignee from "Winstron Corporation" to --Wistron Corporation--.

Signed and Sealed this
Twenty-ninth Day of September, 2015

Michelle K. Lee
*Director of the United States Patent and Trademark Office*